(12) United States Patent
Sawada (10) Patent No.: US 9,886,744 B2
(45) Date of Patent: Feb. 6, 2018

(54) IMAGE PROCESSING APPARATUS, IMAGE PROCESSING METHOD, AND STORAGE MEDIUM WITH IMAGE QUALITY IMPROVEMENT PROCESSING

(71) Applicant: CANON KABUSHIKI KAISHA, Tokyo (JP)

(72) Inventor: Keiichi Sawada, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/277,379

(22) Filed: May 14, 2014

(65) Prior Publication Data
US 2014/0355903 A1 Dec. 4, 2014

(30) Foreign Application Priority Data
May 28, 2013 (JP) ................................. 2013-112024

(51) Int. Cl.
*G06T 5/00* (2006.01)

(52) U.S. Cl.
CPC .............. *G06T 5/002* (2013.01); *G06T 5/003* (2013.01); *G06T 5/007* (2013.01); *G06T 2207/10024* (2013.01); *G06T 2207/20012* (2013.01)

(58) Field of Classification Search
None
See application file for complete search history.

(56) References Cited

U.S. PATENT DOCUMENTS

| | | | |
|---|---|---|---|
| 7,030,913 B2* | 4/2006 | Ikeda | 348/223.1 |
| 7,916,905 B2* | 3/2011 | Yen et al. | 382/118 |
| 8,009,208 B2* | 8/2011 | Steinberg et al. | 348/241 |
| 8,184,177 B2* | 5/2012 | Kakuta | 348/223.1 |
| 8,350,933 B2* | 1/2013 | Fattal | 348/241 |
| 8,786,718 B2 | 7/2014 | Sawada | |
| 8,988,549 B2* | 3/2015 | Kitajima | 348/223.1 |
| 9,013,608 B2* | 4/2015 | Kudo et al. | 348/240.99 |
| 2003/0174216 A1* | 9/2003 | Iguchi et al. | 348/223.1 |

(Continued)

FOREIGN PATENT DOCUMENTS

| | | | |
|---|---|---|---|
| CN | 102170574 | * | 8/2011 |
| CN | 102968767 A | * | 3/2013 |
| JP | 2012-221237 A | | 11/2012 |

OTHER PUBLICATIONS

Kaiming He et al., "Single Image Haze Removal Using Dark Channel Prior", IEEE Transactions on Pattern Analysis and Machine Intelligence, vol. 33, No. 12, Dec. 2011.

*Primary Examiner* — Sumati Lefkowitz
*Assistant Examiner* — Jiangeng Sun
(74) *Attorney, Agent, or Firm* — Fitzpatrick, Cella, Harper & Scinto (57) ABSTRACT

To remove components, such as fog, from a captured image while suppressing a reduction in image quality. An image processing apparatus includes a unit configured to derive parameters for image quality improving processing based on the transmittance of light incident on each pixel of captured image data including a fine particle component and a unit configured to generate corrected image data of the captured image data by performing image quality improving processing to improve image quality of the captured image data using the parameters and removal processing to remove the fine particle component from the captured image data on the captured image data.

8 Claims, 9 Drawing Sheets

(56) References Cited

U.S. PATENT DOCUMENTS

| | | | |
|---|---|---|---|
| 2005/0122409 A1* | 6/2005 | Takeshita | 348/223.1 |
| 2006/0103728 A1* | 5/2006 | Ishigami et al. | 348/180 |
| 2008/0317287 A1* | 12/2008 | Haseyama | 382/103 |
| 2010/0053378 A1* | 3/2010 | Toyoda | H04N 5/222 348/240.99 |
| 2011/0043603 A1* | 2/2011 | Schechner et al. | 348/25 |
| 2012/0200732 A1* | 8/2012 | Takeuchi | 348/223.1 |
| 2012/0300095 A1 | 11/2012 | Sawada | |
| 2014/0140619 A1* | 5/2014 | Mukhopadhyay et al. | 382/167 |
| 2014/0192248 A1* | 7/2014 | Kishi | 348/345 |
| 2014/0320692 A1* | 10/2014 | Ichikawa | 348/223.1 |
| 2015/0002693 A1* | 1/2015 | Cabral et al. | 348/224.1 |
| 2015/0304524 A1* | 10/2015 | Toda | G06T 5/001 382/167 |

\* cited by examiner

|  | SUBJECT LIGHT COMPONENT | FINE PARTICLE COMPONENT | PIXEL VALUE (SUBJECT LIGHT COMPONENT + FINE PARTICLE COMPONENT) |
| --- | --- | --- | --- |
| R (AVERAGE VALUE) | 110 | 40 | 150 |
| G (AVERAGE VALUE) | 80 | 50 | 130 |
| B (AVERAGE VALUE) | 50 | 60 | 110 |

FIG.3A

|  | SUBJECT LIGHT COMPONENT | FINE PARTICLE COMPONENT | PIXEL VALUE (SUBJECT LIGHT COMPONENT + FINE PARTICLE COMPONENT) |
| --- | --- | --- | --- |
| R (AVERAGE VALUE) | 65 | 72 | 137 |
| G (AVERAGE VALUE) | 60 | 90 | 150 |
| B (AVERAGE VALUE) | 55 | 108 | 163 |

FIG.3B

|  | SUBJECT LIGHT COMPONENT | FINE PARTICLE COMPONENT | PIXEL VALUE (SUBJECT LIGHT COMPONENT + FINE PARTICLE COMPONENT) |
| --- | --- | --- | --- |
| R (AVERAGE VALUE) | 180 | 8 | 188 |
| G (AVERAGE VALUE) | 100 | 10 | 110 |
| B (AVERAGE VALUE) | 40 | 12 | 52 |

IMAGE PROCESSING APPARATUS, IMAGE PROCESSING METHOD, AND STORAGE MEDIUM WITH IMAGE QUALITY IMPROVEMENT PROCESSING

BACKGROUND OF THE INVENTION

Field of the Invention

The present invention relates to image processing to remove components, such as fog, in an image.

Description of the Related Art

In the field of the surveillance camera etc., there is such a problem that visibility is reduced due to fine particles (e.g., fog) existing between the camera and a subject and the quality of a captured image deteriorates. The techniques to remove the components, such as fog, have been proposed in Japanese Patent Laid-Open No. 2012-221237 and in "Single Image Haze Removal Using Dark Channel Prior", CVPR 2009 by K. He, J. Sun and X. Tang. In these techniques, fog etc. is removed by calculating the transmittance with respect to fog etc. of light that reaches each pixel based the smallest pixel value of the pixel values of RGB channels of each pixel and by correcting the pixel value of each pixel in accordance with the transmittance.

However, in the above-described techniques, there may be a case where the white balance is disturbed in the image after components, such as fog, are removed. This results from the removal of only components, such as fog, from the image in the state where the white balance is adjusted in accordance with the sum total of the color of the subject and that of the fog etc.

In the case where components, such as fog, are removed, the pixel value is corrected so that the width of the gradation narrowed by the influence of fog etc. is extended, and therefore, noise is also amplified at the same time. The amount of amplification of noise differs depending on the position in the captured image (difference in transmittance from pixel to pixel), and therefore, even in the case where noise reduction processing is performed uniformly on the whole of the captured image, there appear portions where noise reduction is insufficient and portions where noise reduction is excessive depending on the position in the captured image.

SUMMARY OF THE INVENTION

An image processing apparatus according to the present invention has: a unit configured to derive parameters for image quality improving processing based on the transmittance of light incident on each pixel of captured image data including a fine particle component; and a unit configured to generate corrected image data of the captured image data by performing image quality improving processing to improve image quality of the captured image data using the parameters and removal processing to remove the fine particle component from the captured image data on the captured image data.

According to the present invention, it is possible to remove components, such as fog, from a captured image while suppressing a reduction in image quality.

Further features of the present invention will become apparent from the following description of exemplary embodiments (with reference to the attached drawings).

DESCRIPTION OF THE EMBODIMENTS

First Embodiment

Figure 1:
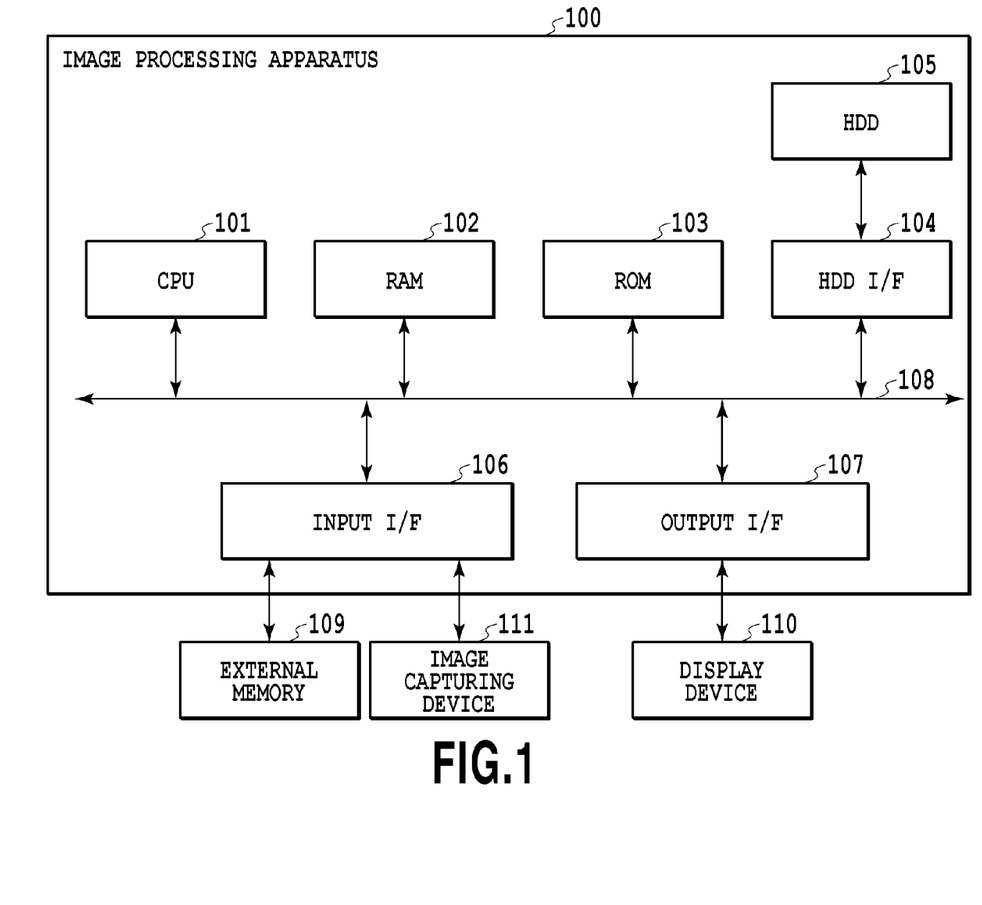
FIG. 1 is a diagram showing an example of a configuration of an image processing apparatus.

FIG. 1 is a diagram showing an example of a configuration of an image processing apparatus according to the present embodiment.

An image processing apparatus 100 includes a CPU 101, a RAM 102, a ROM 103, an HDD I/F 104, an HDD 105, an input I/F 106, an output I/F 107, and a system bus 108 and to the image processing apparatus 100, an external memory 109, a display device 110, and an image capturing device 111 are connected.

The CPU 101 executes programs stored in the ROM 103 using the RAM 102 as a work memory and comprehensively controls each unit, to be described later, via the system bus 108. Due to this, various kinds of processing, to be described later, are performed.

The HDD I/F 104 is an interface, for example, such as a serial ATA (SATA), and is connected with the HDD 105 as the secondary storage device. Via the HDD I/F 104, data is read from the HDD 105 and data is written to the HDD 105. The secondary storage device may be a storage device, such as an optical disk drive, other than the HDD.

The input I/F 106 is a serial bus interface, for example, such as USB and IEEE1394. Via the input I/F 106, data is acquired from the image capturing device 111, the external memory 109 (e.g., hard disc, memory card, CF card, SD card, USB memory), etc.

The output I/F 107 is a video output interface, for example, such as DVI and HDMI (registered trademark). Via the output I/F 107, an image etc. captured by the image capturing device 111 is displayed on the display device 110 (various kinds of output devices, such as a liquid crystal display).

The image capturing device 111 receives light information of a subject with a sensor and acquires digital data (captured image data) of a captured image by carrying out A/D conversion.

There are components of the image processing apparatus 100 other than those described above, however, they are not the main target of the present invention, and therefore, explanation is omitted.

In the present embodiment, the white balance disturbed by fine particles, such as fog, existing between a camera and a subject is adjusted. Fine particles include haze, smoke, etc., besides fog, however, in the following, an image with fog is called a "fogged image". It is possible to express a fogged image by formula (1) below.

[Expression 1]

$$I_x = J_x \cdot \lambda_x + H_x \qquad \text{formula (1)}$$

Here, x denotes the number of the pixel of interest, $I_x$ denotes the pixel value of the pixel of interest x, Jx denotes a value obtained by converting the luminance of light emitted from part of a subject corresponding to the pixel of interest x into a pixel value, $\lambda_x$ denotes the transmittance with respect to fog etc. of light incident on the pixel of interest x, and $H_x$ denotes the component, such as fog, of the pixel value Ix. In the following, "$H_x$" is called the fine particle component and "$J_x \cdot \lambda_x$" is called the subject light component. In other words, the above-described formula (1) expresses that the fogged image is formed by adding the subject light component and the fine particle component. In the following, processing to derive the subject light component $J_x \cdot \lambda_x$ by using the pixel value $I_x$ as an input and by removing the fine particle component $H_x$ therefrom is called "fine particle removal processing".

Next, a specific example of a fogged image is explained.

Figure 2:
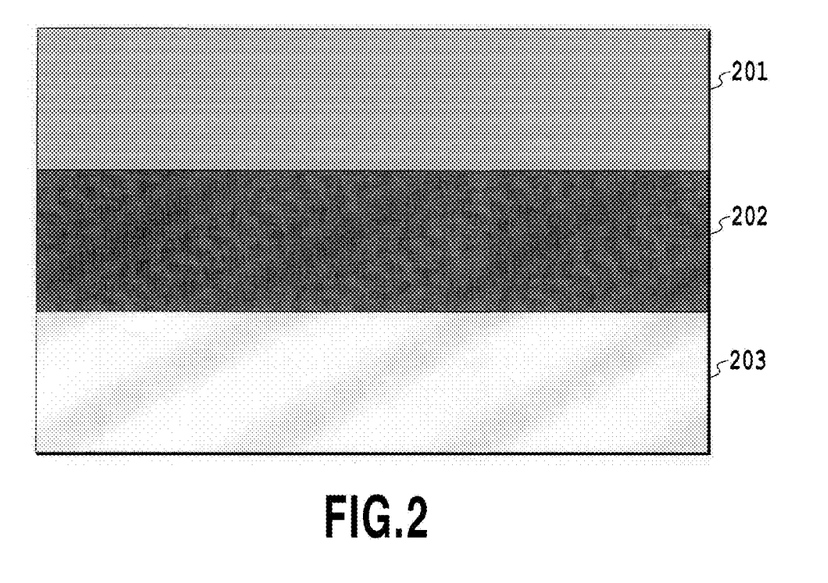
FIG. 2 is a diagram schematically showing a fogged image.

FIG. 2 is a diagram schematically showing a fogged image. In the captured image shown in FIG. 2, three kinds of fogged subjects 201 to 203 are photographed. In this case, it is assumed that the transmittance in the subject 201 is 0.5, the transmittance in the subject 202 is 0.1, and the transmittance in the subject 203 is 0.9.

Figure 3A:
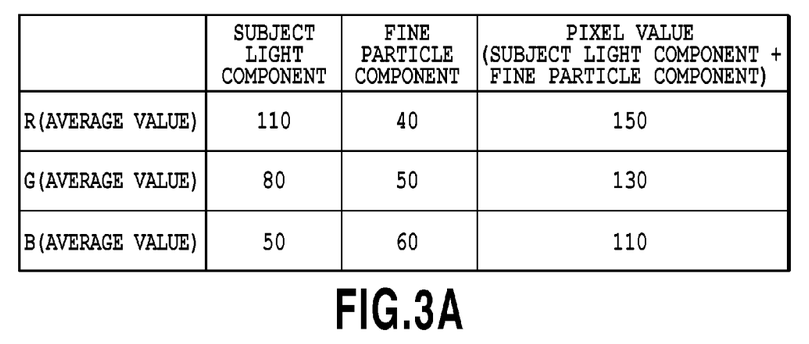
FIGS. 3A, 3B, and 3C are examples of tables each showing an average value of each color channel for each component of each of three kinds of subjects.
Figure 3B:
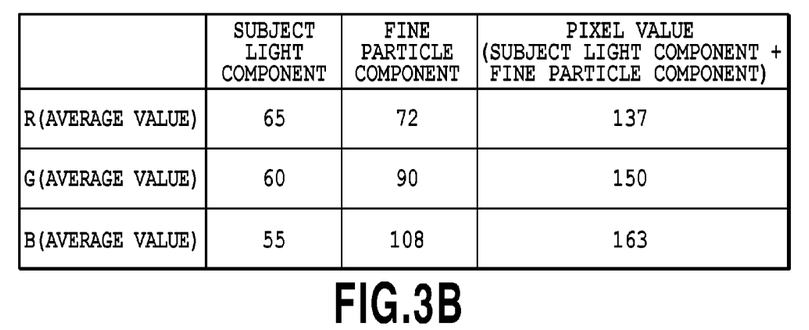
Figure 3C:
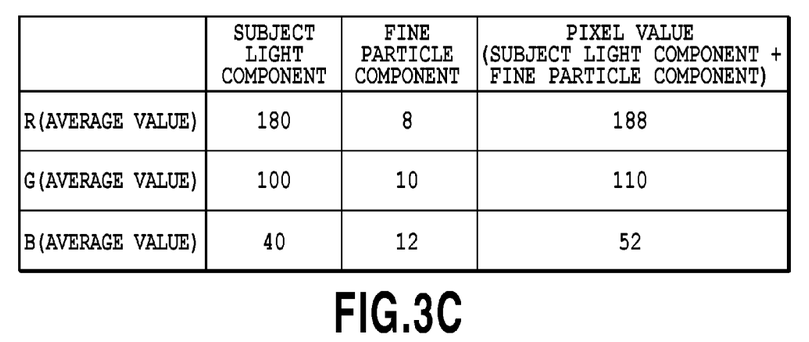

FIGS. 3A to 3C are tables each showing an average value of each color channel for each component in each of the subjects 201 to 203 and FIG. 3A corresponds to the subject 201, FIG. 3B corresponds to the subject 202, and FIG. 3C corresponds to the subject 203. In FIGS. 3A to 3C, it is possible to directly acquire the pixel value (subject light component+fine particle component) from captured image data, however, not possible to directly acquire each value of the subject light component and the fine particle component from captured image data.

Next, adjustment of the white balance is explained.

Adjustment of the white balance is processing to adjust pixel values so that the average value of the R value (red component), the average value of G value (green component), and the average value of the B value (blue component) of a captured image (RGB image) are the same or are values close to one another. In general, the white balance is adjusted by formulas (2) to (4) below.

[Expression 2]

$$R_{wx} = W_R \times R_x \qquad \text{formula (2)}$$

[Expression 3]

$$G_{wx} = W_G \times G_x \qquad \text{formula (3)}$$

[Expression 4]

$$B_{wx} = W_B \times B_x \qquad \text{formula (4)}$$

Here, $R_x$, $G_x$, and $B_x$ are the RGB values of the pixel of interest x before the white balance adjustment and $R_{wx}$, $G_{wx}$, and $B_{wx}$ are the RGB values of the pixel of interest x after the white balance adjustment. Further, $W_R$, $W_G$, and $W_B$ are weights at the time of the white balance adjustment and are expressed by formulas (5) to (11) below.

[Expression 5]

$$W_R = S/S_R \qquad \text{formula (5)}$$

[Expression 6]

$$W_G = S/S_G \qquad \text{formula (6)}$$

[Expression 7]

$$W_B = S/S_B \qquad \text{formula (7)}$$

[Expression 8]

$$S_R = \Sigma_{x \in \Omega} R_x / N \qquad \text{formula (8)}$$

[Expression 9]

$$S_G = \Sigma_{x \in \Omega} G_x / N \qquad \text{formula (9)}$$

[Expression 10]

$$S_B = \Sigma_{x \in \Omega} B_x / N \qquad \text{formula (10)}$$

[Expression 11]

$$S = (S_R + S_G + S_B)/3 \qquad \text{formula (11)}$$

Here, $\Omega$ denotes a set of all the pixels in the captured image and N denotes the number of pixels of the captured image. In the example in FIG. 3,
$S_R = (150 + 137 + 188)/3 = 158.33$
$S_G = (130 + 150 + 110)/3 = 130.00$
$S_B = (110 + 163 + 52)/3 = 108.33$
$S = (158.33 + 130.00 + 108.33)/3 = 132.22$.
As a result, weights are
$W_R = 132.22/158.33 = 0.84$
$W_G = 132.22/130.00 = 1.02$
$W_B = 132.22/108.33 = 1.22$.
Then, from these values, the RGB values $R_{wx}$, $G_{wx}$, and $B_{wx}$ after the white balance adjustment are as follows:
<Subject 201>
$R_{wx} = W_R \times R_x = 0.84 \times 150 = 126.00$
$G_{wx} = W_G \times G_x = 1.02 \times 130 = 132.60$
$B_{wx} = W_E \times B_x = 1.22 \times 110 = 134.20$
<Subject 202>
$R_{wx} = 0.84 \times 137 = 115.08$
$G_{wx} = 1.02 \times 150 = 153.00$
$B_{wx} = 1.22 \times 163 = 198.86$
<Subject 203>
$R_{wx} = 0.84 \times 188 = 157.92$
$G_{wx} = 1.02 \times 110 = 112.2$
$B_{wx} = 1.22 \times 52 = 63.44$.

The average of $R_{wx}$ of the three subjects (all the pixels of the captured image) is 133.00, the average of $G_{wx}$ of those is 132.60, and the average of $B_{wx}$ of those is 132.17. In this manner, the white balance is adjusted so that the values of the R value, the G value, and the B value are substantially the same.

However, what is adjusted by the processing described above is the white balance of an image in the state of being fogged etc., not the white balance of an image including only the subject light component obtained by the fine particle removal processing. For example, in the case where the white balance adjustment processing described above is performed on each subject light component in FIG. 3, the RGB values after the adjustment ($R_{wx}$, $G_{wx}$, $B_{wx}$) will be as follows <Subject 201>
$R_{wx}=W_R \times R_x=0.84 \times 110=92.40$
$G_{wx}=W_G \times G_x=1.02 \times 80=81.60$
$B_{wx}=W_E \times B_x=1.22 \times 50=61.00$ <Subject 202>
$R_{wx}=0.84 \times 65=54.60$
$G_{wx}=1.02 \times 60=61.20$
$B_{wx}=1.22 \times 55=67.10$ <Subject 203>
$R_{wx}=0.84 \times 180=151.2$
$G_{wx}=1.02 \times 100=102.00$
$B_{wx}=1.22 \times 40=48.80$.

The average of $R_{wx}$ of the three subjects (all the pixels of the captured image) is 99.40, the average of $G_{wx}$ of those is 81.60, and the average of $B_{wx}$ of those is 58.97. It is known that the white balance is disturbed compared to the values after the white balance adjustment on the fogged image (subject light component+fine particle component). As described above, even in the case where the white balance is maintained in a fogged image, the white balance is disturbed in the case where the image is turned into an image having only the subject light component by the fine particle removal processing. In the present embodiment, in order to solve this problem, weights at the time of the white balance adjustment are derived based on the transmittance.

Figure 4:
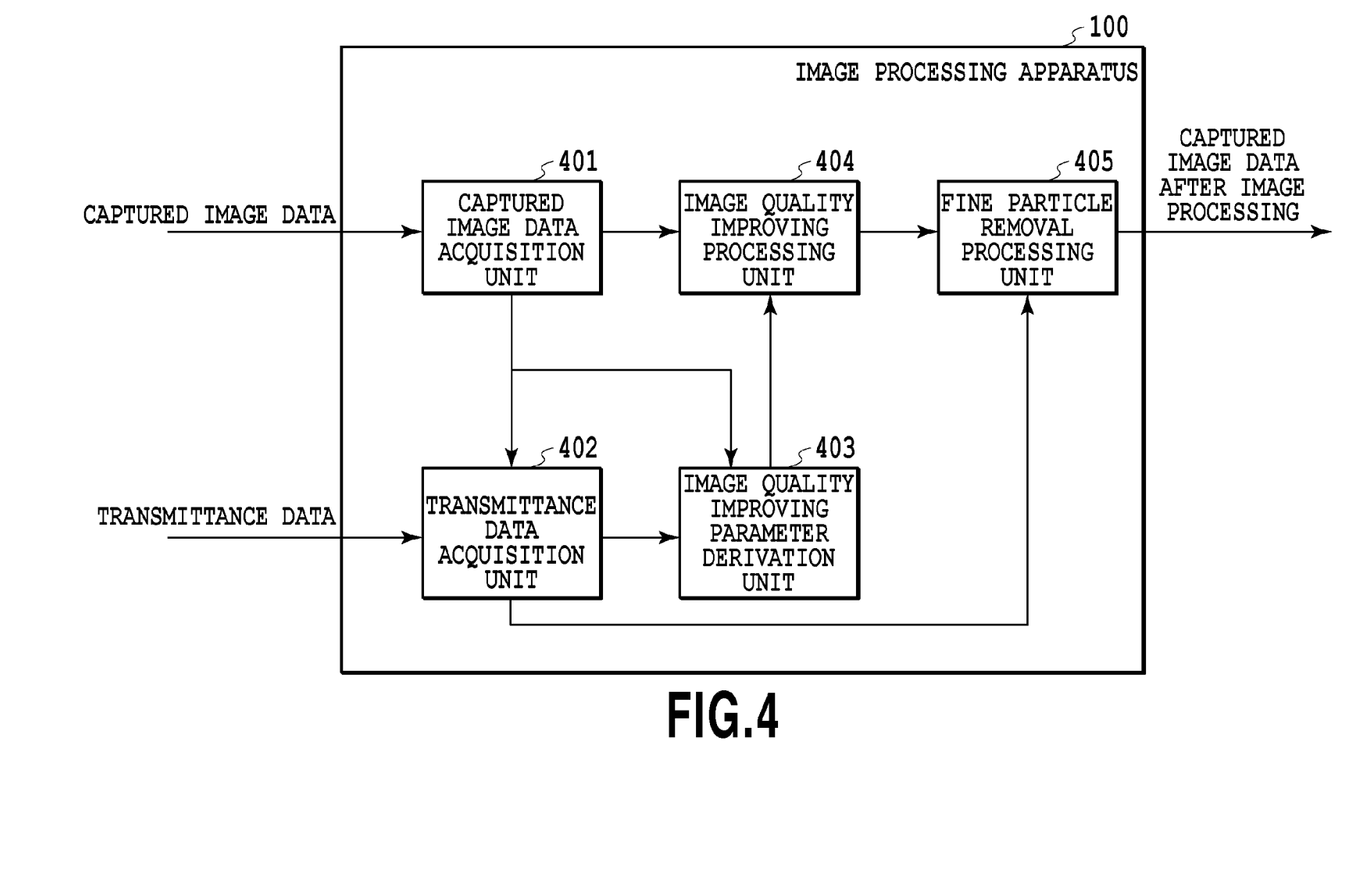
FIG. 4 is a function block diagram of an image processing apparatus according to a first embodiment.

FIG. 4 is a function block diagram of the image processing apparatus 100 according to the present embodiment and the image processing apparatus 100 includes a captured image data acquisition unit 401, a transmittance data acquisition unit 402, an image quality improving parameter derivation unit 403, an image quality improving processing unit 404, and a fine particle removal processing unit 405. The image processing apparatus 100 implements the function of each of the units described above by loading control programs stored within the ROM 103 on the CPU 101 and executing the control programs. The outline of each unit is as follows.

The captured image data acquisition unit 401 acquires captured image data from the image capturing device 111. The acquired captured image data is sent to the transmittance data acquisition unit 402, the image quality improving parameter derivation unit 403, and the image quality improving processing unit 404.

The transmittance data acquisition unit 402 acquires data of the transmittance in the acquired captured image. The acquired data of transmittance is sent to the image quality improving parameter derivation unit 403 and the fine particle removal processing unit 405.

The image quality improving parameter derivation unit 403 derives parameters used in the image quality improving processing (in the present embodiment, weights at the time of the white balance adjustment processing) from the captured image data and the data of transmittance. The derived image quality improving parameters are sent to the image quality improving processing unit 404.

The image quality improving processing unit 404 performs image quality improving processing (in the present embodiment, white balance adjustment processing) on the captured image using the derived image quality improving parameters. The data of the captured image having been subjected to the image quality improving processing is sent to the fine particle removal processing unit 405.

The fine particle removal processing unit 405 performs the processing to remove the fine particle component from the captured image having been subjected to the image quality improving processing and generates captured image data including only the subject light component.

Figure 5:
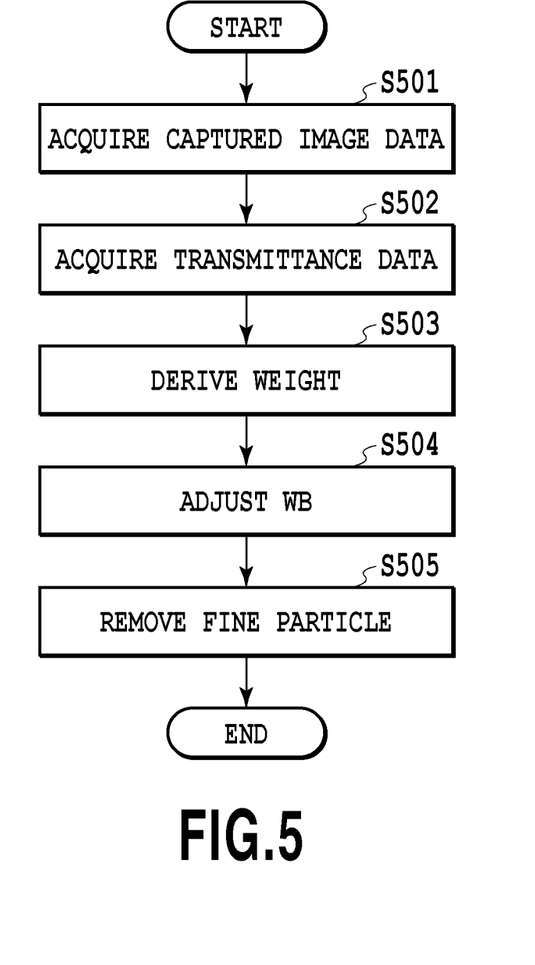
FIG. 5 is a flowchart showing a flow of processing to generate image data of a fogged image from which a fine particle component is removed according to the first embodiment.

FIG. 5 is a flowchart showing a flow of the processing to generate image data obtained by removing the fine particle component from a fogged image while suppressing a reduction in image quality. The series of processing is performed by the CPU 101 executing a computer executable program in which the procedure shown below is described after reading the program from the ROM 103 onto the RAM 102.

At step 501, the captured image data acquisition unit 401 acquires data of an image captured by the image capturing device 111. The acquired captured image data is sent to the transmittance data acquisition unit 402 and the image quality improving processing unit 404.

At step 502, the transmittance data acquisition unit 402 acquires data of the transmittance in the acquired captured image. It may also be possible to acquire the data of transmittance from outside through the input I/F 106 (e.g., input via a keyboard, not shown) or to estimate the data of transmittance from the acquired captured image by the principle of the dark channel prior etc. Further, the transmittance depends on the subject distance, and therefore, it may also be possible to acquire data of the distance to the subject and to calculate the transmittance therefrom. The principle of the dark channel prior and the method for calculating the transmittance from the subject distance are not the main purpose of the present invention, and therefore, explanation is omitted. The acquired data of transmittance is sent to the image quality improving parameter derivation unit 403 and the fine particle removal processing unit 405.

At step 503, the image quality improving parameter derivation unit 403 calculates weights at the time of the white balance adjustment as the image quality improving parameters from the captured image data and the data of transmittance. Specifically, as described previously, weights at the time of the white balance adjustment processing are derived so that the average value of the R value of all the pixels, the average value of the G value of those, and the average value of the B value of those are close to one another. In all the pixels of the captured image, some pixels whose transmittance $\lambda_x$ is low (pixels greatly affected by fog etc.) are included. Because of this, weights that strongly reflect the pixel values of the pixels whose transmittance $\lambda_x$ is high (pixels slightly affected by fog etc.) are found by formula (12) to formula (18) below.

[Expression 12]

$$W'_R = S''/S'_R \qquad \text{formula (12)}$$

[Expression 13]

$$W'_G = S''/S'_G \qquad \text{formula (13)}$$

[Expression 14]

$$W'_B = S''/S'_B \qquad \text{formula (14)}$$

[Expression 15]

$$S'_R = \Sigma_{x \in \Omega} \lambda_x R_x / N \qquad \text{formula (15)}$$

[Expression 16]

$$S' = \Sigma_{x \in \Omega} \lambda_x G_x / N \qquad \text{formula (16)}$$

[Expression 17]

$$S'_B = \Sigma_{x \in \Omega} \lambda_x B_x / N \quad \text{formula (17)}$$

[Expression 18]

$$S' = (S'_R + S'_G + S'_B)/3 \quad \text{formula (18)}$$

For example, in the case where the transmittances $\lambda_x$ of the subjects 201 to 203 shown in FIG. 2 described above and the pixel values shown in the table in FIG. 3 are applied to formula (12) to formula (18) described above, the results will be as follows.

First, from formula (15) to formula (18),
$S'_R = (0.5 \times 150 + 0.1 \times 137 + 0.9 \times 188)/3 = 85.97$
$S'_G = (0.5 \times 130 + 0.1 \times 150 + 0.9 \times 110)/3 = 59.67$
$S'_E = (0.5 \times 110 + 0.1 \times 163 + 0.9 \times 52)/3 = 39.37$
$S' = (85.97 + 59.67 + 39.37)/3 = 61.67$.

As a result of that, from formula (12) to formula (14), weights will be
$W'_R = 61.67/85.97 = 0.72$
$W'_G = 61.67/59.67 = 1.03$
$W'_B = 61.67/39.37 = 1.57$.

In this manner, weights that strongly reflect the pixel values of the pixels whose value of the transmittance $\lambda_x$ is high (pixels slightly affected by fog etc.) are derived.

Explanation is returned to the flowchart in FIG. 5.

At step 504, the image quality improving processing unit 404 performs the white balance adjustment processing as the image quality improving processing on the capture image using the weights derived at step 503. Specifically, new pixel values $R'_{wx}$, $R'_{wx}$, and $B'_{wx}$ are found using formula (19) to formula (21) below.

[Expression 19]

$$R'_{wx} = W'_R \times R_x \quad (19)$$

[Expression 20]

$$G'_{wx} = W'_G \times G_x \quad \text{formula (20)}$$

[Expression 21]

$$B'_{wx} = W'_B \times B_x \quad \text{formula (21)}$$

For example, it is assumed that each weight derived at step 503 is $W'_R = 0.72$, $W'_G = 1.03$, and $W'_B = 1.57$, and the RGB values of the captured image are the RGB values of the subject light component shown in the table in FIG. 3. In this case, the new pixel values $R'_{wx}$, $G'_{wx}$, and $B'_{wx}$ as below are found from the above-mentioned formula (19) to formula (21).

<Subject 201>
$R'_{wx} = 0.72 \times 110 = 79.2$
$G'_{wx} = 1.03 \times 80 = 82.4$
$B'_{wx} = 1.57 \times 50 = 78.5$ <Subject 202>
$R'_{wx} = 0.72 \times 65 = 46.8$
$G'_{wx} = 1.03 \times 60 = 61.8$
$B'_{wx} = 1.57 \times 55 = 86.35$ <Subject 203>
$R'_{wx} = 0.72 \times 180 = 129.6$
$G'_{wx} = 1.03 \times 100 = 103.00$
$B'_{wx} = 1.57 \times 40 = 62.8$ The average of $R'_{wx}$ of the three subjects (all the pixels of the captured image) is 85.20, the average of $G'_{wx}$ of those is 82.40, and the average of $B'_{wx}$ of those is 75.89. From this, it is known that the white balance is less disturbed compared to the results of the white balance adjustment by the conventional method (average of $R_{wx}$: 99.40, average of $G_{wx}$: 81.60, average of $B_{wx}$: 58.97).

Explanation is returned to the flowchart in FIG. 5.

At step 505, the fine particle removal processing unit 405 removes the fine particle component from the captured image whose white balance is adjusted obtained at step 504 and generates captured image data including only the subject light component $J_x \cdot \lambda_x$. Specifically, first, a pixel whose fine particles, such as fog, are the densest in the captured image is specified. Any method may be used as processing to specify the pixel whose fine particles are the densest and for example, it may also be possible to specify the pixel whose fine particles are the densest by a method in which the color of fog etc. is assumed to be white and the pixel whose average value of the RGB values is the largest in all the pixels is specified as the pixel whose fog is the densest. In order to prevent a pixel in the portion where the subject itself is white, not a pixel that is white due to the influence of fog etc., from being specified in this specification processing, it is recommended to refer to a plurality of pixels around the pixel of interest and to compare a pixel whose average value of the RGB values is the smallest in the plurality of pixels with the pixel of interest. By assuming that the transmittance of the pixel whose fog etc. is the densest specified by the above-mentioned method is 0 and by multiplying the pixel value of the pixel whose fog etc. is the densest by $(1-\lambda_x)$, it is possible to find the fine particle component Hx. Then, by subtracting the fine particle component Hx that is found from the pixel value $I_x$ of the pixel of interest x, it is possible to obtain a captured image from which the fine particle component is removed. The method of fine particle removal processing described here is a mere example and the method is not limited to this.

As above, in the present embodiment, the white balance of a captured image before the fine particle removal processing is adjusted using the weights that strongly reflect the pixel value of the pixel slightly affected by fog etc. (transmittance is high). Then, by performing the fine particle removal processing on the captured image having been subjected to the white balance adjustment such as this, it is possible to obtain a fine particle removed image in a well-balanced state.

Second Embodiment

In the first embodiment, the aspect is explained in which the white balance adjustment processing is performed as the contents of the image quality improving processing. Next, an aspect is explained as a second embodiment, in which noise reduction processing is performed as the contents of the image quality improving processing. Explanation of the portions in common to those of the first embodiment is omitted or simplified and different points are explained mainly.

As described previously, in the fine particle removal processing, the pixel value is corrected so that the width of the gradation hidden by fog etc. is extended, and therefore, noise is also amplified at the same time. Consequently, the lower the transmission of a pixel (the more affected by fog etc.), the more becomes the amount of correction of the pixel value, and therefore, the amount of amplification of noise also increases. Because of this, in the case where noise reduction processing is performed uniformly on the whole of a captured image, there arises such a problem as a result that noise reduction is insufficient in a pixel whose transmittance is low and noise reduction is excessive in a pixel whose transmittance is high. Consequently, in the present embodiment, the degree of noise reduction processing is adjusted based on the transmittance and thereby, it is made possible to perform appropriate noise reduction processing for each pixel.

Figure 6:
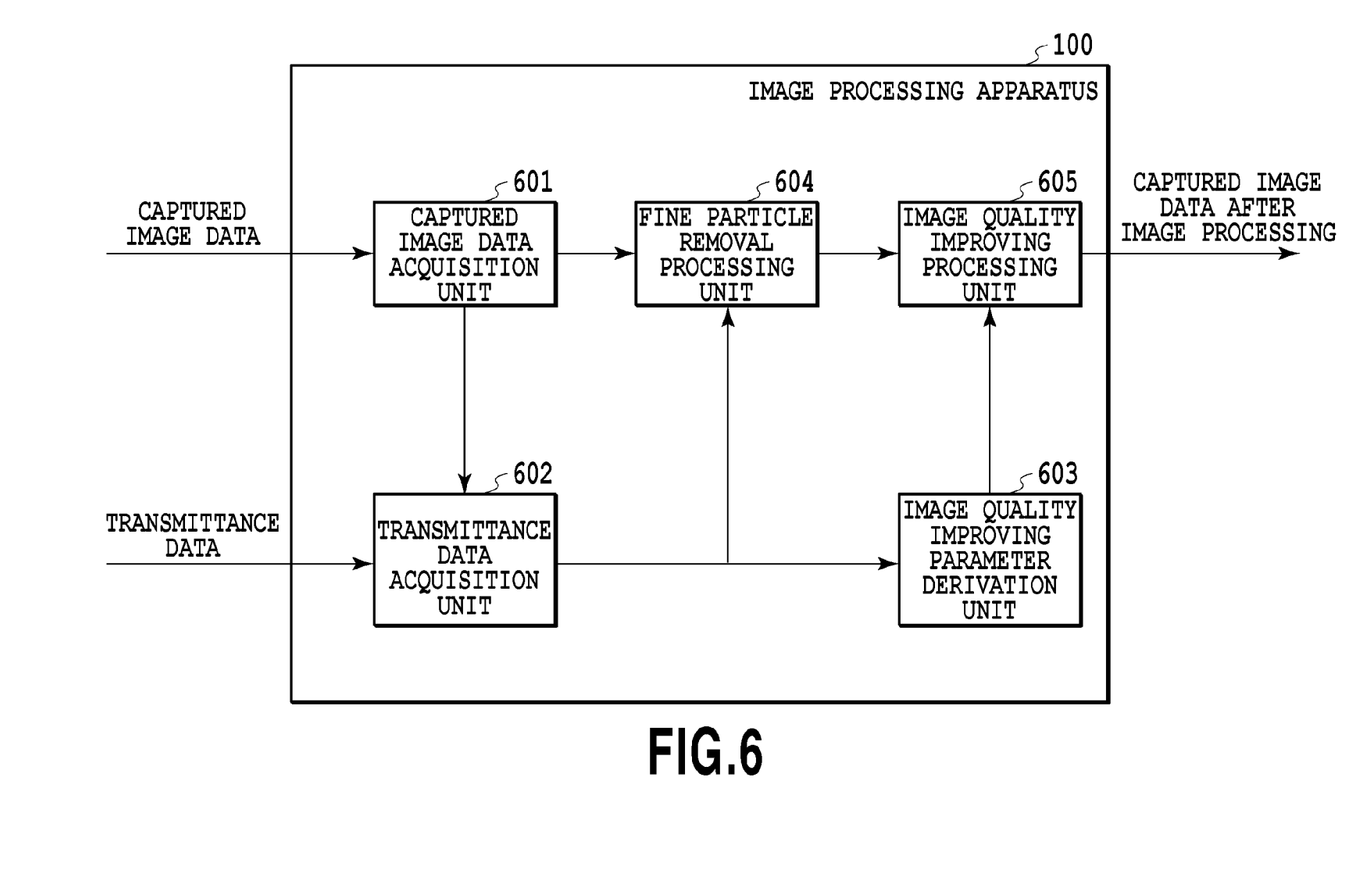
FIG. 6 is a function block diagram of an image processing apparatus according to a second embodiment.

FIG. 6 is a function block diagram of the image processing apparatus 100 according to the present embodiment and the image processing apparatus 100 includes a captured image data acquisition unit 601, a transmittance data acquisition unit 602, an image quality improving parameter derivation unit 603, a fine particle removal processing unit 604, and an image quality improving processing unit 605. The image processing apparatus 100 implements the function of each of the units described above by loading control programs stored in the ROM 103 on the CPU 101 and by executing the control programs. The outline of each unit is as follows.

The captured image data acquisition unit 601 acquires captured image data from the image capturing device 111. The acquired captured image data is sent to the transmittance data acquisition unit 602 and the fine particle removal processing unit 604.

The transmittance data acquisition unit 602 acquires data of the transmittance in the acquired captured image. The acquired data of transmittance is sent to the image quality improving parameter derivation unit 603 and the fine particle removal processing unit 604.

The image quality improving parameter derivation unit 603 derives parameters (in the present embodiment, degrees of noise reduction processing) used in the image quality improving processing from the data of transmittance. The derived image quality improving parameters are sent to the image quality improving processing unit 605.

The fine particle removal processing unit 604 removes the fine particle component from the captured image. The data of captured image from which the fine particle component is removed is sent to the image quality improving processing unit 605.

The image quality improving processing unit 605 performs the image quality improving processing (in the present embodiment, noise reduction processing) using the derived image quality improving parameters on the captured image from which the fine particle component is removed.

Figure 7:
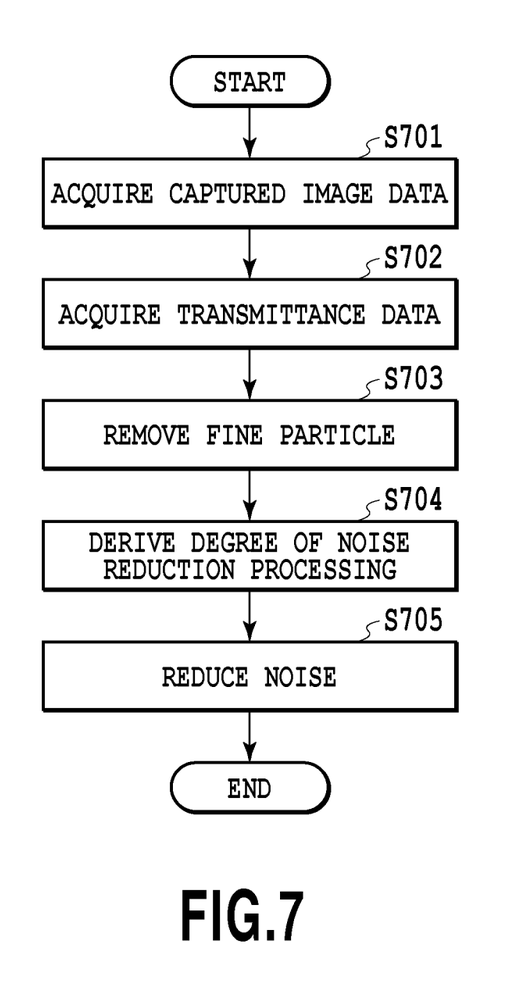
FIG. 7 is a flowchart showing a flow of processing to generate image data of a fogged image from which the fine particle component is removed according to the second embodiment.

FIG. 7 is a flowchart showing a flow of the processing to generate image data of a fogged image from which the fine particle component is removed while suppressing a reduction in image quality. The series of processing is performed by the CPU 101 executing a computer executable program in which the procedure shown below is described after reading the program from the ROM 103 onto the RAM 102.

At step 701, the captured image data acquisition unit 601 acquires data of an image captured by the image capturing device 111. The acquired captured image data is sent to the transmittance data acquisition unit 602 and the fine particle removal processing unit 604.

At step 702, the transmittance data acquisition unit 602 acquires data of the transmittance in the acquired captured image. The acquired data of transmittance is sent to the image quality improving parameter derivation unit 603 and the fine particle removal processing unit 604.

At step 703, the fine particle removal processing unit 604 removes the fine particle component from the captured image. Unlike the first embodiment, the fine particles are removed from the captured image before subjected to the image quality improving processing and the noise amplified by this fine particle removal processing is reduced at step 705, to be described later.

At step 704, the image quality improving parameter derivation unit 603 derives degrees of noise reduction processing as the image quality improving parameters from the data of transmission. As the degree of noise reduction processing, mention is made of, for example, the standard deviation $\sigma_x$ of the Gaussian function and the size of the reference pixel range of the filter.

First, a method for deriving the standard deviation $\sigma_x$ of the Gaussian function as the degree of noise reduction processing is explained. In the noise reduction by a general Gaussian filter, the same value is used as $\sigma_x$ regardless of the pixel of interest x. In the present embodiment, however, the standard deviation $\sigma_x$ of the Gaussian function in the pixel of interest x is found using formula (22) below.

[Expression 22]

$$\sigma_x = \sigma_m / \lambda_m \quad \text{formula (22)}$$

Here, $\sigma_m$ is an arbitrary coefficient representing the overall degree of noise reduction. A user may give $\sigma_m$ via the input I/F 106 or a fixed value that does not depend on the captured image may be used. From formula (22) described above, it is known that the lower the transmittance $\lambda_x$, the larger becomes the value of $\sigma_x$ and the higher becomes the degree of noise reduction processing (noise reduction effect).

Next, a method for deriving the size of the range of a set $\Phi$ of all the reference pixels of the filter as the degree of noise reduction processing is explained. In noise reduction by a general Gaussian filer, $\Phi$ is the peripheral pixels of the pixel of interest x and the size of the range remains the same regardless of the pixel of interest x. In the present embodiment, however, a radius $D_x$ [pixel] of the range of $\Phi$ of the pixel of interest x is found using formula (23) below.

[Expression 23]

$$D_x = \text{round}(D_m / \lambda_x) \quad \text{formula (23)}$$

Here, $D_m$ is an arbitrary coefficient. A user may give $D_m$ via the input I/F 106 or a fixed value that does not depend on the captured image may be used. Further, the round ( ) function indicates rounding off. From formula (23) described above, it is known that the lower the transmittance $\lambda_x$, the larger becomes the radius $D_x$ indicative of the range of the set $\Phi$ of reference pixels of the filter and the higher becomes the degree of noise reduction processing (noise reduction effect).

Explanation is returned to the flowchart in FIG. 7.

At step 705, the image quality improving processing unit 605 performs the processing to reduce noise of the captured image in accordance with the degree of noise reduction processing derived at step 704. Specifically, noise is reduced, for example, using the Gaussian filter expressed by formula (24) below and the range filter expressed by formula (25).

[Expression 24]

$$O_x = K \Sigma_{\xi \in \Phi} \exp[-\{(x-\xi)/\sigma_x\}^2/2] \cdot I_x \quad \text{formula (24)}$$

[Expression 25]

$$O_x = K \Sigma_{\xi \in \Phi} \exp[-\{(I_x - I_\xi)/\sigma_x\}^2/2] \cdot I_x \quad \text{formula (25)}$$

Here, $\xi$ is the reference pixel number of the filter, $\Phi$ is the set of all the reference pixels of the filter, $I_x$ is the pixel value before noise reduction, $O_x$ is the pixel value after noise reduction, $\sigma_x$ is the standard deviation of the Gaussian function of the filter in the pixel of interest x (filter coefficient), and K is the normalization coefficient. In formula (24) and formula (25) described above, the larger the standard deviation $\sigma_x$, the stronger becomes the noise reduction effect, and the larger the range of $\Phi$, which is the set of the pixels within a finite range around the pixel of interest x, the stronger becomes the noise reduction effect.

Although the example is explained in which the Gaussian function is used as the filter function of the noise reduction filter, however, it is possible to apply the present embodiment to a noise reduction filter using any filter function.

In the flowchart in FIG. 7 described above, the noise amplified by the fine particle removal processing is reduced, however, it may also be possible to suppress amplification itself of noise by performing the noise reduction processing on the captured image before the fine particle removal processing. In this case, it may also be possible to derive the degree of the noise reduction processing having taken into consideration the transmittance $\lambda_x$ by formula (22) and formula (23) described above. By doing so, it is made possible to perform the intense noise reduction processing in the position where the amount of amplification of noise due to the fine particle removal is large and to perform the weak noise reduction processing in the position where the amount of amplification of noise due to the fine particle removal is small.

As above, in the present embodiment, it is possible to determine the degree of the noise reduction processing based on the transmittance with respect to fog etc. of light incident on each pixel of a captured image and to perform the noise reduction processing in accordance with the amount of amplification of noise due to the fine particle removal. Due to this, it is possible to obtain a fine particle removed image with less noise.

Third Embodiment

In the first embodiment, in order to obtain a fine particle removed image the white balance of which is adjusted well, the fine particle removal processing is performed after adjusting the white balance of the captured image. Next, an aspect is explained as a third embodiment, in which the white balance is adjusted after performing the fine particle removal processing. Explanation of the portions in common to those of the first embodiment is omitted or simplified and different points are explained mainly.

In the case where the white balance adjustment processing is performed on the captured image having been subjected to the fine particle removal processing, weights at the time of the white balance adjustment are derived based on the pixel value whose noise is amplified by the fine particle removal processing, and therefore, the accuracy of the white balance adjustment is reduced. Because of this, in the present embodiment, weights at the time of the white balance adjustment are derived by taking into consideration the amount of amplification of noise.

Figure 8:
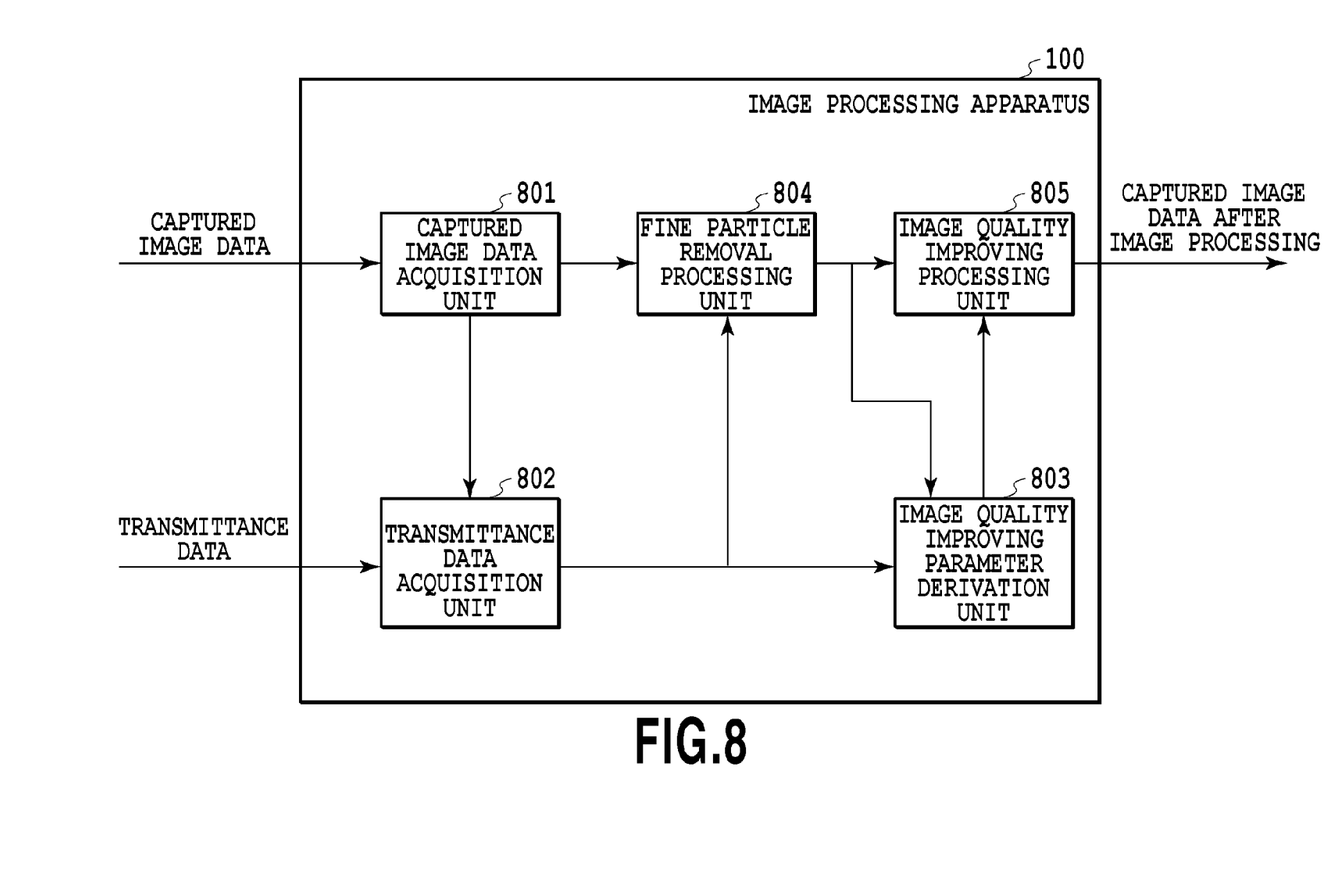
FIG. 8 is a function block diagram of an image processing apparatus according to a third embodiment.

FIG. 8 is a function block diagram of the image processing apparatus 100 according to the present embodiment and the image processing apparatus 100 includes a captured image data acquisition unit 801, a transmittance data acquisition unit 802, a fine particle removal processing unit 803, an image quality improving parameter derivation unit 804, and an image quality improving processing unit 805. The image processing apparatus 100 implements the function of each of the units described above by loading control programs stored in the ROM 103 on the CPU 101 and executing the control programs. The outline of each unit is as follows.

The captured image data acquisition unit 801 acquires captured image data from the image capturing device 111. The acquired captured image data is sent to the transmittance data acquisition unit 802 and the fine particle removal processing unit 803.

The transmittance data acquisition unit 802 acquires data of the transmittance in the acquired captured image. The acquired data of transmittance is sent to the fine particle removal processing unit 803 and the image quality improving parameter derivation unit 804.

The fine particle removal processing unit 803 removes the fine particle component from the captured image. The data of the captured image from which the fine particle component is removed is sent to the image quality improving parameter derivation unit 804 and the image quality improving processing unit 805.

The image quality improving parameter derivation unit 804 derives parameters used in the image quality improving processing (in the present embodiment, weights at the time of the white balance adjustment) from the captured image data having been subjected to the fine particle removal processing and the data of transmittance. The derived image quality improving parameters are sent to the image quality improving processing unit 805.

The image quality improving processing unit 805 performs the image quality improving processing (in the present embodiment, the white balance adjustment processing) on the captured image having been subjected to the fine particle removal processing by using the derived image quality improving parameters.

Figure 9:
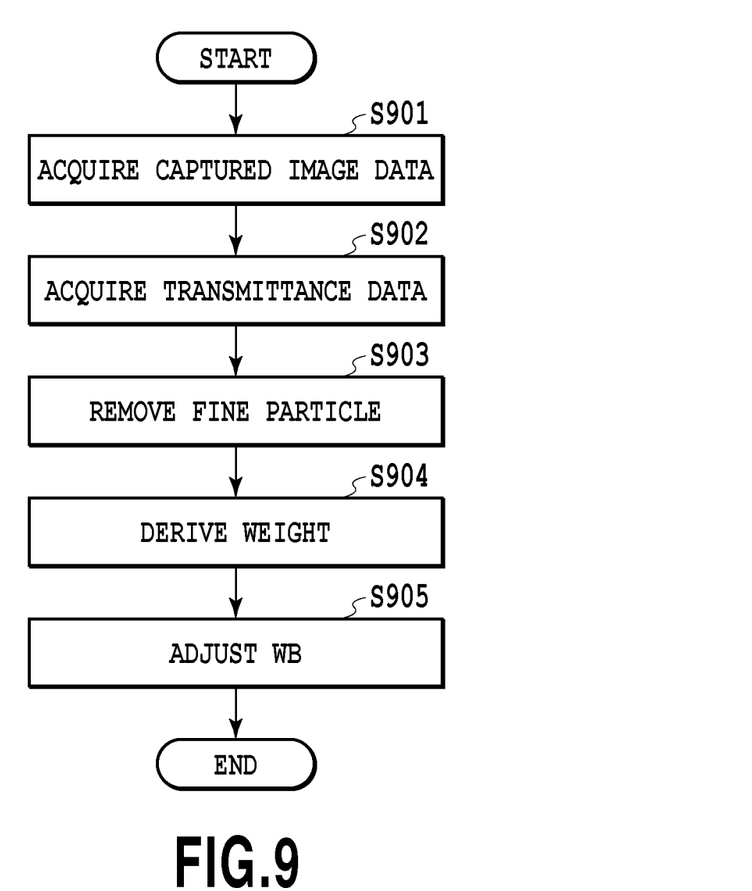
FIG. 9 is a flowchart showing a flow of processing to generate image data of a fogged image from which the fine particle component is removed according to the third embodiment.

FIG. 9 is a flowchart showing a flow of the processing to generate image data of a fogged image from which the fine particle component is removed while suppressing a reduction in image quality. The series of processing is performed by the CPU 101 executing a computer executable program in which the procedure shown below is described after reading the program from the ROM 103 onto the RAM 102.

At step 901, the captured image data acquisition unit 801 acquires data of an image captured by the image capturing device 111. The acquired captured image data is sent to the transmittance data acquisition unit 802 and the fine particle removal processing unit 803.

At step 902, the transmittance data acquisition unit 802 acquires data of the transmittance in the acquired captured image. The acquired data of transmittance is sent to the fine particle removal processing unit 803 and the image quality improving parameter derivation unit 804.

At step 903, the fine particle removal processing unit 803 removes the fine particle component from the captured image. Unlike the first embodiment, the white balance adjustment having taken into consideration the noise amplified by the fine particle removal processing performed on the captured image before being subjected to the image quality improving processing is performed at step 905, to be described later.

At step 904, the image quality improving parameter derivation unit 804 derives weights at the time of the white balance adjustment from the captured image data having been subjected to the fine particle removal processing and the data of transmittance. Specifically, as in the first embodiment, weights at the time of the white balance adjustment that strongly reflect the pixel value of the pixel whose transmittance $\lambda_x$ is high are found using formula (12) to formula (18) described previously. The reason is that the pixel whose transmittance $\lambda_x$ is high has a small amount of amplification of noise, and therefore, it is possible to suppress a reduction in accuracy of the white balance adjustment. In this case, $R_x$, $G_x$, and $B_x$ in formula (15) to formula (17) will be the pixel values of the captured image after the component of fine particles, such as fog, is removed.

At step 905, the image quality improving processing unit 805 performs the white balance adjustment processing in accordance with the weights derived at step 904. The white balance adjustment is performed using formula (19) to formula (21) described previously as in the first embodiment, however, in the present embodiment, the white balance of the pixel values $R_x$, $G_x$, and $B_x$ in the captured image after fog etc. is removed is adjusted as a result.

As above, in the present embodiment, weights that strongly reflect information of the pixel whose amount of amplification of noise is small (transmittance is high) are derived and a reduction in accuracy of the white balance is suppressed. Due to this, it is possible to obtain a fine particle removed image whose white balance is adjusted well.

Other Embodiments

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-112024 filed May 28, 2013, which is hereby incorporated by reference herein in its entirety.

What is claimed is:

1. An image processing apparatus comprising:
a processor; and
a memory, the processor and the memory configured to function as:
   a derivation unit configured to derive parameters for white balance adjustment processing based on a transmittance of light incident on each pixel of captured image data including a fine particle component corresponding to fine particles suspended in the atmosphere when the image data is captured; and
   a generation unit configured to generate corrected image data of the captured image data by performing white balance adjustment processing on the captured image data to effect white balance adjustment of the captured image data using the derived parameters, and performing removal processing on the captured image data to remove the fine particle component from the captured image data using the transmittance,
wherein the derived parameters are weights that reflect a pixel value of a pixel having a high transmittance more than the pixel value of a pixel having a low transmittance,
wherein the removal processing includes:
   (i) referring to a plurality of pixels neighboring a pixel of interest to specify a pixel having a smallest average value of an RGB value out of the plurality of pixels;
   (ii) calculating a fine particle component of the pixel of interest by:
      (a) assuming a transmittance of the specified pixel is 0; and
      (b) multiplying a pixel value of the specified pixel by a value obtained by subtracting a transmittance of the pixel of interest from 1; and
   (iii) subtracting the fine particle component of the pixel of interest from a pixel value of the pixel of interest.

2. The image processing apparatus according to claim 1, wherein
the image quality improvement processing is noise reduction processing, and
the parameter for the image quality improvement processing is degree of the noise reduction processing.

3. The image processing apparatus according to claim 2, wherein the degree of the noise reduction processing is a filter coefficient of a noise reduction filter.

4. The image processing apparatus according to claim 2, wherein the degree of the noise reduction processing is a size of a reference pixel range of a noise reduction filter.

5. The image processing apparatus according to claim 1, wherein, before the white balance adjustment processing is performed, captured image data, from which the fine particle component is removed, is generated in the removal processing, and
the derivation unit derives the weights using the generated image from which the fine particle component is removed.

6. An image processing method comprising the steps of:
deriving parameters for white balance adjustment processing based on a transmittance of light incident on each pixel of captured image data including a fine particle component corresponding to fine particles suspended in the atmosphere when the image data is captured; and
generating corrected image data of the captured image data by performing white balance adjustment processing on the captured image data to effect white balance adjustment of the captured image data using the derived parameters and, after the white balance adjustment processing is performed, performing removal processing on the captured image data to remove the fine particle component from the captured image data using the transmittance,
wherein the derived parameters are weights that reflect a pixel value of a pixel having a high transmittance more than the pixel value of a pixel having a low transmittance,
wherein the removal processing includes:
referring to a plurality of pixels neighboring a pixel of interest to specify a pixel having a smallest average value of an RGB value out of the plurality of pixels;
assuming a transmittance of the specified pixel is 0;

multiplying a pixel value of the specified pixel by a value obtained by subtracting a transmittance of the pixel of interest from 1 to obtain a fine particle component of the pixel of interest; and subtracting the fine particle component of the pixel of interest from a pixel value of the pixel of interest.

7. A non-transitory computer readable storage medium storing a program for causing a computer to perform an image processing method, the method comprising the steps of:

deriving parameters for white balance adjustment processing based on a transmittance of light incident on each pixel of captured image data including a fine particle component corresponding to fine particles suspended in the atmosphere when the image data is captured; and generating corrected image data of the captured image data by performing white balance adjustment processing on the captured image data to effect white balance adjustment of the captured image data using the derived parameters and, after the white balance adjustment processing is performed, performing removal processing on the captured image data to remove the fine particle component from the captured image data using the transmittance, wherein the derived parameters are weights that reflect a pixel value of a pixel having a high transmittance more than the pixel value of a pixel having a low transmittance, wherein the removal processing includes:

referring to a plurality of pixels neighboring a pixel of interest to specify a pixel having a smallest average value of an RGB value out of the plurality of pixels;

assuming a transmittance of the specified pixel is 0;

multiplying a pixel value of the specified pixel by a value obtained by subtracting a transmittance of the pixel of interest from 1 to obtain a fine particle component of the pixel of interest; and subtracting the fine particle component of the pixel of interest from a pixel value of the pixel of interest.

8. The image processing apparatus according to claim 1, wherein after the white balance adjustment processing is performed, the generation unit performs the removal processing.

* * * * *